United States Patent [19]

Höting et al.

[11] 4,218,828

[45] Aug. 26, 1980

[54] DEVICE FOR MEASURING THE TIGHTENING ANGLE ON A WRENCH

[75] Inventors: Johann-Peter Höting; Armin Rahn, both of Hamburg; Hermann-Jochen Zerver, Remscheid, all of Fed. Rep. of Germany

[73] Assignee: C. Plath KG, Hamburg, Fed. Rep. of Germany

[21] Appl. No.: 973,311

[22] Filed: Dec. 26, 1978

[30] Foreign Application Priority Data

Dec. 29, 1977 [DE] Fed. Rep. of Germany ....... 2758703

[51] Int. Cl.³ .............................................. G01C 9/18
[52] U.S. Cl. ...................................... 33/334; 33/300; 73/139
[58] Field of Search ................. 73/139, 490, 521, 493, 73/515; 33/300, 334

[56] References Cited

U.S. PATENT DOCUMENTS

| | | | |
|---|---|---|---|
| 2,504,139 | 4/1950 | Malen | 33/300 |
| 3,029,644 | 4/1962 | Loreless et al. | 73/490 |
| 4,091,664 | 5/1978 | Zerver | 73/139 |

*Primary Examiner*—S. Clement Swisher
*Attorney, Agent, or Firm*—Norman E. Burnell; Walter R. Thiel; Alfred B. Levine

[57] ABSTRACT

An improved device for measuring the tightening angle on a wrench. The directionally fixed member is a liquid body which may include solid particles or a turbine wheel, the relative velocity of which is monitored to determine the relative motion of the liquid with respect to the wrench.

14 Claims, 5 Drawing Figures

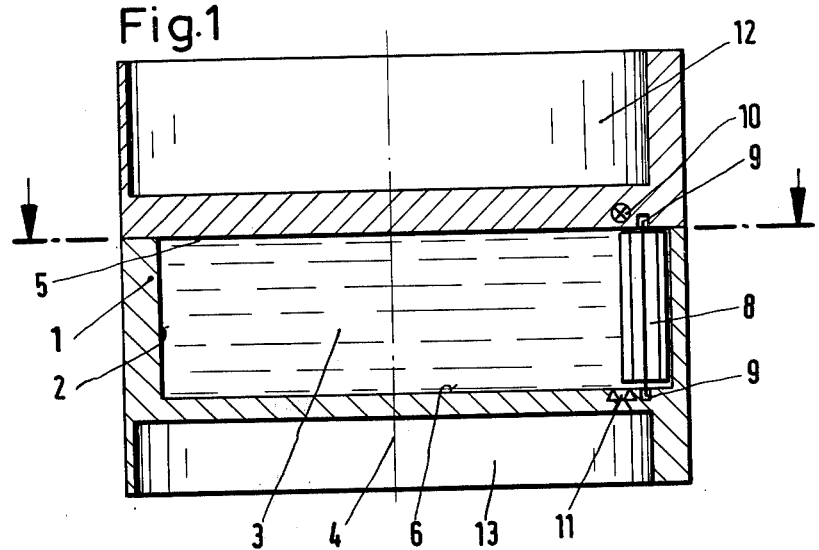
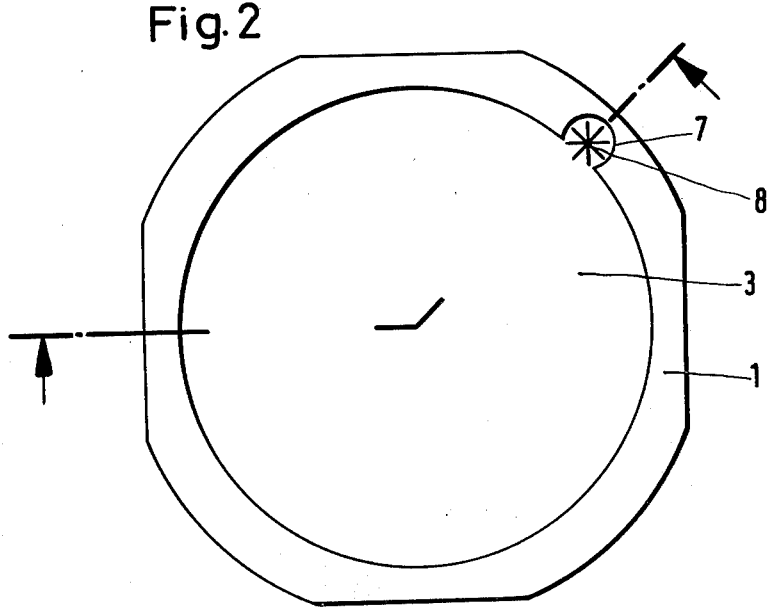

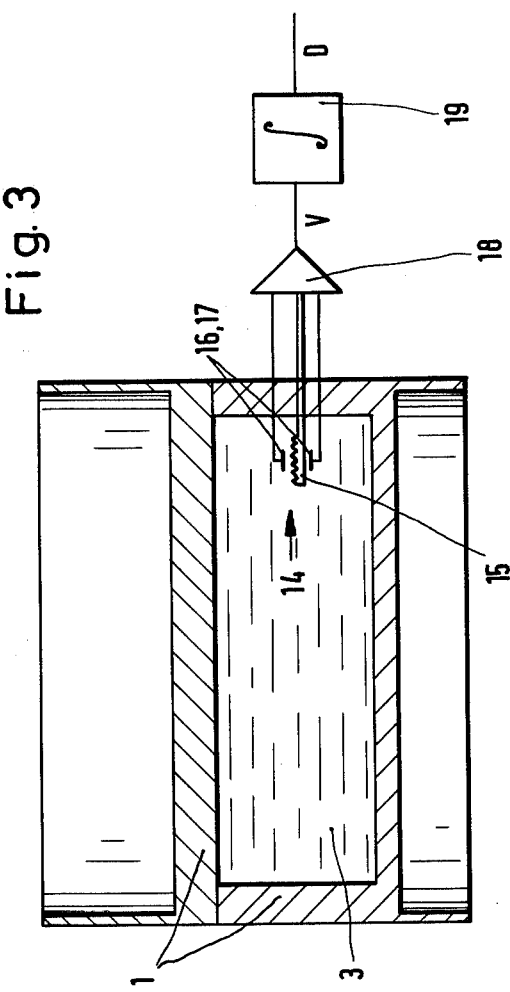

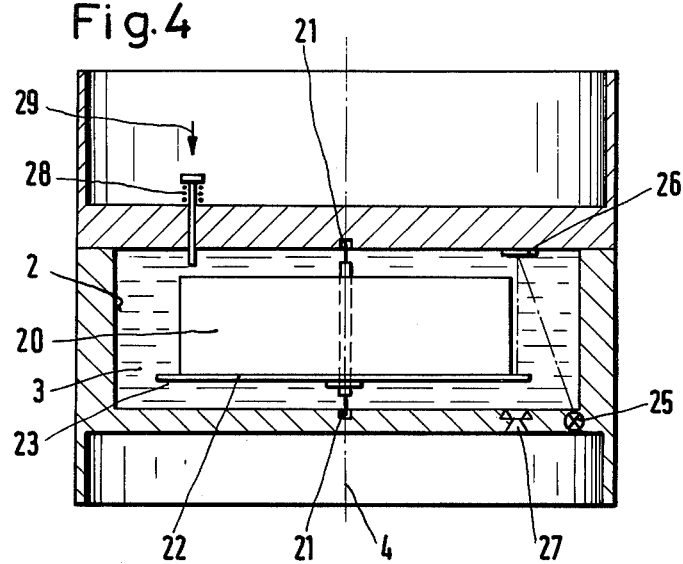
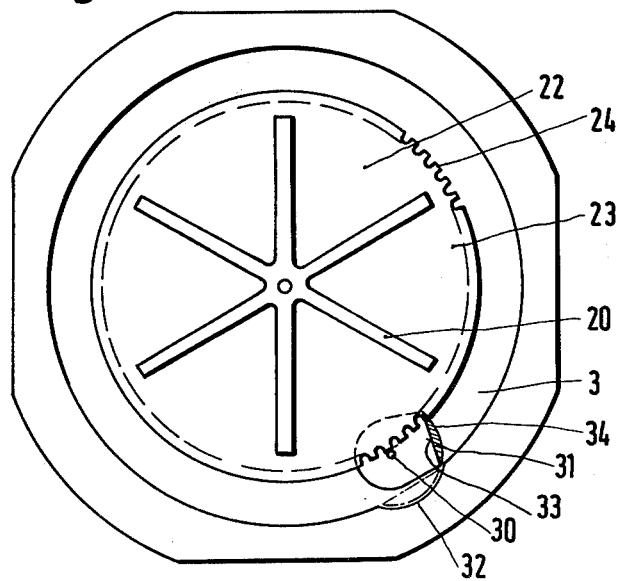

DEVICE FOR MEASURING THE TIGHTENING ANGLE ON A WRENCH

U.S. Pat. App. Ser. No. 869,403, filed Jan. 16, 1978 for "Device for Measuring the Tightening Angle on a Wrench", Hallbauer et al, is assigned to the assignee of the instant invention, now abandoned, and relates to a device for measuring the tightening angle on a wrench with respect to a directionally fixed member possessing a high moment of inertia pivoted thereupon for the indication of a reference direction which is characterized in that the directionally fixed member is constituted of a body possessing, in comparison with the frictional moment moment of its support or seating, a high moment of inertia. Since this body, due to its inertia, does not follow the rotation of the wrench or follows it only to an insignificant degree, it is capable of indicating the reference direction for measuring the tightening angle of the wrench. According to the main patent this body shall be supported floatingly and essentially free from the influence of any forces and in a liquid accommodated inside a housing that is arranged on the wrench; such a forces-free mode of support is, however, comparatively expensive.

Consequently, the present invention seeks to create a device of the type mentioned in the beginning which, as far as the support of the inert body is concerned, is less costly.

The solution according to the invention consists in that the liquid itself is regarded as being the inert body and in that a measuring device is provided for determining its relative motion with respect to the housing.

When the wrench is turned, the liquid attempts, due to its inertia, to retain its previous position (or its previous state of motion). Determinations as to the relative motion of the housing with respect to the liquid are thus capable of providing information concerning the absolute angle of rotation of the housing. It goes without saying that the chamber provided inside the housing for accommodating the liquid shall have a rotational shape with an axis of symmetry or axis of rotation extending parallely to the axis of rotation of the wrench. It stands to reason, moreover, that this chamber will have to be filled completely as far as this proves feasible. It is expedient, furthermore, that only one liquid be employed that possesses a specific weight which is identical throughout.

Measuring methods are available for determining the relative motion of the liquid in comparison with the housing surrounding the same. It is possible, for example, to determine the relative velocity of the liquid with respect to the housing by means of pressure head measuring (with the aid of a Prandtl tube). It is possible, moreover, to determine the relative velocity in an electromagnetic manner in accordance with the EM-log principle. A further possibility consists in that a turbine wheel is mounted on the circumference of the liquid accommodation chamber, which wheel projects into the chamber only with a portion of its circumference and is thereby driven by the relative motion of the liquid with respect to the housing so that its velocity represents a measurement of the velocity of the liquid and the number of its revolutions represents a measurement of the absolute displacement.

It is possible to directly measure the relative motion of the liquid with respect to the housing by means of observing solid bodies which are uniformly distributed in the liquid. A very simple form of this principle is the uniform, statistical distribution of small lamellar or dust-like particles as a dispersion, the movement of which can be scanned by optical-electrical means in that the number of particles passing a sensing device are counted. Even if their individual spacing may be statistically irregular, the irregularities equalize themselves when the number of particles present is adequate.

Irregular currents occurring within the liquid which may be caused, for instance, by Coriolis forces, are capable of detracting from the accuracy of the measuring results. It is expedient, therefore, to suppress such irregular currents by means of rigidly interconnected, solid elements distributed in the liquid. It is highly expedient if these solid elements do possess a cellular structure, the simplest type of which is represented by a concentrically mounted wheel with radial blades as is known in the form of an impeller in pumps with a gyrating ring of liquid. The uniform cell arrangements, as would be found in such a wheel would, however, not be a prerequisite; a statistically irregular cell distribution would also suffice, such as is to be found in spongeously foamed synthetic resins. However, the cells must have open pores so as to enable them to fill with liquid in a uniform manner. For the function aimed at according to the invention, however, this is not an absolute necessity. For this reason, fleece-like (fibrous??) structures come into consideration as well. These solid bodies should be pivoted around the central axis of the housing so that they do not rub against the housing wall. Furthermore it is of advantage when their moment of inertia is slight in comparison with that of the liquid. This condition is all the more important the more the specific weight of the solid bodies diverges from that of the liquid. If, however, according to a further characteristic feature of the invention, the specific weights of the solid bodies and of the liquid are close to one another, then it does not matter so much. Also, in such a case, an accurately concentric mounting of the solid structure inside the housing and an exact conformity of its centroidal axis with the axis of rotation is not critical. It is also possible to mount the structure with a generous amount of play and, consequently, very inexpensively without any impairment of the indicating accuracy.

When solid elements are present uniformly distributed in the liquid, these may be utilized for scanning the movement of the liquid. They may, by way of example, be provided along their circumference with a toothed wheel, the teeth of which are scanned and counted with the aid of a light barrier or the like. It is also possible, if the housing is transparent, to utilize them indirectly for the angular measuring in connection with a scale provided on the circumference of the housing.

For some measuring processes it is of relevance that the liquid and, possibly, the solid body present therein, be in a state of rest at the beginning of the measuring operation, that is to say prior to the wrench being tightened. This applies particularly in the case where the absolute angle of the rotation of the housing with respect to the liquid is measured. A braking means is provided for such cases which first induces the liquid into a state of rest. Suitable for this purpose is, by way of example, an electromagnetic brake which operates according to the opposite principle of the EM-log. The braking of the liquid proves to be relatively simple when rigidly interconnected solid bodies are present uniformly distributed in the liquid. If this is the case, then, for instance, a locking bar or the like that can be radially inserted from the housing circumference will suffice, which retains these elements, while they, in turn, retain the liquid.

However, it is not necessary in the case of all measuring methods to immobilize the liquid at the start of the measuring operation.

This applies particularly to those methods in which a velocity comparison with integration takes place. In such a case, the measuring device is designed in such a way that it first determines the initial velocity before the start of the measuring operation and, subsequently, its changes. It is also possible to employ this principle when the measuring of the velocity is based upon a counting process. In such a case no need exists for a braking means.

In the following the invention is explained in greater detail while reference is made to the accompanying drawings which illustrate advantageous embodiment examples. In these FIGS. 1 and 2 show a longitudinal section or cross section according to the line of intersection stated therein through an embodiment provided with a turbine wheel mounted on the circumference of the chamber accommodating the liquid;

FIG. 3 shows a longitudinal section through a second embodiment provided with an electromechanical measuring device, and FIGS. 4 and 5 show a third embodiment provided with a concentrically mounted star-shaped wheel in longitudinal and cross section.

The housing 1 constitutes an accommodation chamber for the liquid 3, the circumferential surface 2 of which is cylindrical and which, at the top and at the bottom, is delimited by parallel plane surfaces 6 that extend perpendicularly to the center axis 4. The liquid 3 completely fills the accommodation chamber. No installations exist inside the chamber accommodating the liquid. Likewise, the liquid does not contain any solid elements. At 7, a—in cross section—star shaped wheel 8 is mounted on the circumference of the chamber accommodating the liquid within an axis-parallel space 7 located parallely thereto, the length of said wheel corresponds roughly to the height of the chamber accommodating the liquid and which, at 9, is mounted with a light fit. Its blades project slightly inwardly over the circumferential surface 2 so that they are entrained by the liquid rotating with respect to housing 1, so that the star-shaped wheel is induced into a rotation in the opposite direction to the sense of rotation of the liquid. For this reason this wheel is also designated as a turbine wheel in other portions of this specification. A light source is provided at 10, opposite to which, on the other side of the chamber accommodating the liquid 3, an electric photoreceiver is disposed. The components 10 and 11 jointly constitute a light barrier that is arranged in such a way that its beam is momentarily interrupted by the passing of the blades of turbine wheel 8. The photoconductive cell 11 is connected to a counting circuit.—At 12 and 13 the housing forms accommodation spaces for component parts that have not been illustrated, e.g. the electronic circuit, a battery, indicating instruments, etc.

The housing 1 is attached to the wrench in such a manner that its axis 4 is located parallely to the axis of rotation of the wrench. Prior to the wrench being tightened, the liquid in the chamber accommodating the liquid 3 is brought into a state of rest by nonillustrated means. By way of example, these means may consist of an electromagnetic brake. If the tool is now turned in order to tighten the bolt, then housing 1 follows up the rotation while the liquid contained in accommodation chamber 3 retains its original position. This leads to a relative motion of the liquid with respect to the housing, by means of which the turbine wheel 8 is made to rotate, which leads to alternating bright-dark pulses being generated in the photoconductive cell 11, which are counted. The counting result is proportional to the angle of rotation of the tool. When it is indicated in an appropriate manner, it is possible for the user of the tool to determine which angle of rotation he is covering and he will be able to restrict the tightening angle to a specific, predetermined value.—When a previous immobilization of the liquid in the housing is not desired, then it is possible for the counting circuit connected to the photoconductive cell 11 to be designed in such a way that it determines the velocity of the liquid present when the wrench is in a state of immobility by measuring the pulse frequency and in such a way that it makes due allowance for the subsequent change in the velocity due to the tool motion.

Unless it has been explained otherwise in the following, the embodiment according to FIG. 3 corresponds to the one shown in FIGS. 1 and 2. A schematically depicted sensing device 14 for measuring the relative velocity between the liquid and the housing is arranged on the circumference of the liquid accommodation chamber 3. This consists of a coil 15 which produces a magnetic field in the liquid and of two electrodes 16 and 17 arranged laterally thereof, which are connected to an amplifier 18, the output of which is connected to an integration circuit 19. When current passes through coil 15 and thus produces a magnetic field in the liquid, a voltage is generated at the electrodes 16 and 17 which is proportional to the velocity of the liquid which is amplified by the amplifier 18. Thus the amplifier signal V is also proportional to the velocity of the liquid. If this signal is integrated by integration circuit 19, a signal D is obtained which is proportional to the path travelled, that is to say the angle of rotation. It may be indicated in angular degrees on the device so that the user will be able to directly read the tightening angle when the liquid was immobilized before the start of the tightening motion.—In this case, too, it is possible to dispense with an immobilization of the liquid when the electronic circuit is designed in such a way that the initial velocity is compensated for.

Housing and liquid accommodation chamber of the embodiment according to FIG. 5 corresponds to the ones shown in FIGS. 1 to 3. Mounted concentrically in liquid accommodation chamber 3 is a starshaped wheel 20 at 21, the radial blades of which extend transversally to the circumferential direction of the liquid accommodation chamber and which come close to the circumferential wall 2. A disk 22 is connected to the blades transversally to the axis of the wheel, the margin 23 of which projecting outwardly over the blades is provided with a plurality of notches or indentations 24 which interact with the liquid barrier that is made up of a light source 25, a mirror 26 and a photoconductive cell 27. The indentations are narrower than the measuring tolerance of the device. The seating has a very light fit. The star-shaped wheel consists of a material which has the same specific weight as the liquid surrounding it. Consequently, in the case of a relative motion of the housing, it will remain immobile just as the liquid will and thus forms a measurement of the rotational position of the liquid. The number of the pulses delivered by the photoconductive cell 27 is thus proportional to the relative angle of rotation between the liquid and the housing. As in the instances explained in the foregoing, an electronic circuit is connected to the photoconductive cell for evaluation and representation of the counting result.

At 28 a pin is illustrated which projects into the liquid accommodation chamber 3 and is sealed by the housing, which pin may be advanced by a force in the direction of arrow 29 in such a manner that it retains the star-shaped wheel 20 and thus brakes and stops the liquid. After this force ceases to be exerted, the pin is returned again into its inactive position by means of spring tension. The immobilization of the star-shaped wheel may also be utilized for inducing the liquid into a state of rest before the measuring operation is commenced. However, the arrangement shown is less suitable for this purpose due to the substantial amount of play between the pin 28 and the blades 20.

A brake that is more suitable for these purposes is indicated in FIG. 5. On the excentrically arranged axis of rotation 30, which is arranged parallely to the axis of the device, a braking blade 31 is provided which may be swivelled, by driving means that are not shown, out of its position of rest indicated by continuous lines, the rest position being at the same time the braking position, into the disengaged position indicated by dash-dot lines. The leaf extends essentially across the entire length of the liquid accommodation chamber 3. In its rest position the edge of the blade engages with the marginal indentations 24 of the star-shaped wheel and arrests it in this way. In addition, due to its place extension transversally to the circumferential direction of the liquid accommodation chamber, it forms a flow resistance and, thereby, a brake which acts upon the liquid. In its disengaged position it is located in a recess 32 in housing 1, the inner surface 33 of blade 31 being shaped and located in such a way that it is aligned with the circumferential surface 2 of the liquid accommodation chamber and thus does not constitute any unnecessary frictional contact with the liquid. Its outer surface 34, just like the surface of the recess 32, may follow a circular arc around the axis 30. It can thus be noted that the blade, in its entirety, is shaped similarly to the circular arc along which it travels between the two terminal positions. It is ensured hereby that the motion of the braking blade does not exert any significant momentum on the liquid in the circumferential position. Since it is impossible to ideally fit to match the inner surface 33 of the blade to the shape of the arc, the shape of the outer surface 34 may, divergent from the circular arc illustrated, be formed in such a way that it equalizes the momentum possibly exerted from the inner surface 33 on the liquid.

It goes without saying that the divergence of the blade shape from the desired circular shape can be avoided when the circumstance is dispensed with that the blade, in its disengaged position, constitutes a portion of the circumferential surface of the liquid accomodation chamber. By way of example, it is possible to extend and to retract the blade through a slot provided in the circumferential surface of the liquid accommodation chamber.

The starting point of the angle of rotation measurement with a wrench is formed by the position of the bolt with a certain minimum tightening, where it may be assumed that accidentally caused differences in the initial friction are compensated for. In order to prevent an individual evaluation of the determination of this starting point, the wrench may be fitted with a torquemeter which signals this starting position. In order to also avoid the braking of the liquid in the device being subjected to the individually varying treatment, this operation is expediently performed in an automatic manner. This is done in that the torquemeter, when reaching the bolt tightening which designates the starting position, causes the production of a stop signal and, after the lapse of a certain period of time, the release of the brake and the production of a disengaged signal. For example, it is possible for the stop signal to prevent, in a mechanical manner, a forward movement of the wrench so that the same remains immobile for a certain period of time. It is more expedient, however, to merely produce an acoustical or optical control signal, so that the user of the wrench holds the tool motionlessly during the subsequent period of time. During this period of time the brake is automatically kept in engagement until after the automatically measured period of time the disengaged signal is produced which indicates to the user of the tool that the wrench has now to be turned through prescribed tightening angle. It is true that it is possible for the angle of rotation to be indicated as such by the device; it is to be preferred, however, that the prescribed angle of rotation be set on the device and that this produces an additional signal for the user of the tool as soon as the preset value is reached.

It is expedient for the brake to assume its braking position in its normal position. On the one hand, it is prevented hereby that during accidental movements of the tool, e.g. when applying the tool to the bolt to be tightened, the liquid in the device assumes a strong relative movement with respect to the housing. On the other hand, it is achieved hereby that an actuation of the brake with a corresponding consumption of energy only takes place during the relatively brief period of time during which the measuring operation occurs.

The device is not merely suitable for measuring the angle of rotation of wrenches, but also for other application purposes, for example, for the change of direction indication of vehicles.

Of particular advantage is the employment of the device for measuring the angle of rotation of a reciprocating movement, because in this type of operation the measuring errors arising from a certain degree of entrainment of the liquid in the one direction of motion are again equalized during the return motion. This application instance consequently permits the carrying out of a measuring operation with an increased degree of accuracy.

We claim:

1. An improved device for measuring the tightening angle on a wrench with respect to a directionally fixed member pivoted in a housing thereupon for the indication of a reference direction, of the type in which the directionally fixed member is a body possessing a high moment of inertia relative to the frictional moment of its pivotal mounting, wherein the improvement comprises:
   an inertial body of liquid; and
   means for determining the relative motion of the liquid with respect to the housing.

2. A device as claimed in claim 1, wherein the improvement further comprises:
   solid elements distributed in the liquid; and
   means for detecting the motions of these elements.

3. A device as claimed in claim 2, wherein the liquid includes rigidly interconnected and uniformly distributed elements.

4. A device as claimed in claim 3, wherein the solid elements are of a cellular structure.

5. A device as claimed in claim 4, wherein the cellular elements are composed in a stellate manner.

6. A device as claimed in claims 3 or 4, wherein the moment of inertia of the solid elements is slight in comparison with that of the liquid.

7. A device as claimed in claims 3 or 4, wherein the density of the solid elements is similar to that of the liquid.

8. A device as claimed in claims 1 or 3, wherein the means for determining the relative motion comprises:
   means for measuring and integrating the relative velocity.

9. A device as claimed in claims 1 or 3, wherein the means for determining the relative motion comprises:
   means for counting the solid elements or markings thereon.

10. A device as claimed in claims 3 or 4, wherein the improvement further comprises:
    a braking device interacting with the solid elements.

11. A device as claimed in claims 3 or 4, wherein the improvement further comprises:
    a braking device which acts directly upon the liquid.

12. A device as claimed in claim 11, wherein the braking device comprises:
    a braking surface which may be selectively positioned transversally to the path of motion of the liquid.

13. A device as claimed in claim 11 wherein the improvement further comprises:
    a torquemeter; and
    means responsive to the torquemeter for the selective release of the brake.

14. A device as claimed in claim 11 wherein the improvement further comprises:
    a torquemeter; and
    means responsive to the torquemeter for the selective release of the brake.

* * * * *